United States Patent
Nezou et al.

(10) Patent No.: US 10,009,924 B2
(45) Date of Patent: Jun. 26, 2018

(54) METHOD AND DEVICE FOR OPTIMIZING ACCESS TO A MEDIUM IN A COMMUNICATION NETWORK

(75) Inventors: Patrice Nezou, Saint Sulpice la Foret (FR); Julien Sevin, Saint Aubin du Cormier (FR); Pascal Viger, Janze (FR)

(73) Assignee: Canon Kabushiki Kaisha, Tokyo (JP)

(*) Notice: Subject to any disclaimer, the term of this patent is extended or adjusted under 35 U.S.C. 154(b) by 410 days.

(21) Appl. No.: 14/118,735

(22) PCT Filed: May 14, 2012

(86) PCT No.: PCT/IB2012/052393
§ 371 (c)(1),
(2), (4) Date: Feb. 21, 2014

(87) PCT Pub. No.: WO2012/160474
PCT Pub. Date: Nov. 29, 2012

(65) Prior Publication Data
US 2014/0153514 A1    Jun. 5, 2014

(30) Foreign Application Priority Data

May 20, 2011    (GB) .................................. 1108509.0

(51) Int. Cl.
*H04W 74/08*     (2009.01)
*H04L 12/413*    (2006.01)

(52) U.S. Cl.
CPC ....... *H04W 74/0816* (2013.01); *H04L 12/413* (2013.01); *H04W 74/085* (2013.01)

(58) Field of Classification Search
CPC ......... H04W 74/0816; H04W 74/0808; H04W 74/0825; H04W 74/08; H04W 74/085;
(Continued)

(56) References Cited

U.S. PATENT DOCUMENTS

2005/0025176 A1* 2/2005 Ko ...................... H04W 74/085
                                                              370/448
2007/0041397 A1* 2/2007 Hwang ............. H04W 74/0875
                                                              370/448
(Continued)

FOREIGN PATENT DOCUMENTS

GB            2423162 A       8/2006

OTHER PUBLICATIONS

Kyasanur P et al., "Detection and handling of MAC layer misbehavior in wireless networks", Proceedings 2003 International Conference on Dependable Systems and Networks. DSN 2003. San Francisco, CA, Jun. 22-25, 2003: [International Conference on Dependable Systems and Networks], Los Alamitos, CA: IEEE Comp. Soc, US, Jun. 22, 2003, pp. 173-182.
(Continued)

*Primary Examiner* — Candal Elpenord
*Assistant Examiner* — Ricardo Castaneyra
(74) *Attorney, Agent, or Firm* — Canon U.S.A., Inc. IP Division

(57) ABSTRACT

The invention is directed to the optimization of an access to a medium in wireless networks which can be accessed by a plurality of nodes, each node of the plurality of nodes using a medium access mechanism of the Carrier Sense Multiple Access with Collision Avoidance type based on a computation of a backoff value. A specific value is associated with each node of a set of nodes of the plurality of nodes, the specific value of a node being known by the other nodes of the set of nodes. According to the invention, a backoff value is determined for each node of the set of nodes, in each node of the set of nodes, the backoff value associated with a node being determined as a function of the specific value associated with that node.

14 Claims, 3 Drawing Sheets

(58) Field of Classification Search
CPC ........... H04W 74/0833; H04W 28/044; H04W 28/04; H04W 74/0841; H04W 74/0858; H04L 12/413
See application file for complete search history.

(56) References Cited

U.S. PATENT DOCUMENTS

2009/0274167 A1* 11/2009 Yamazaki ............. H04L 12/413
370/445
2009/0310620 A1* 12/2009 Yoshizawa .......... H04W 74/085
370/461
2010/0232324 A1* 9/2010 Radunovic ............ H04L 12/413
370/277

OTHER PUBLICATIONS

Siwaruk Siwamogsatham Ed—Anonymous: "A novel smart-DCF scheme for high-speed WLANs", Communications and Information Technologies, 2007. ISCIT 07. International Symposium On, IEEE, PI, Oct. 1, 2007, pp. 1032-1037.
Moraes R et al: "ATDMA-based mechanism to enforce real-time behavior in WiFi networks", Factory Communication Systems, 2008. WFCS 2008. IEEE International Workshop On, IEEE, Piscataway, NJ, USA, May 21, 2008, pp. 109-112.

* cited by examiner

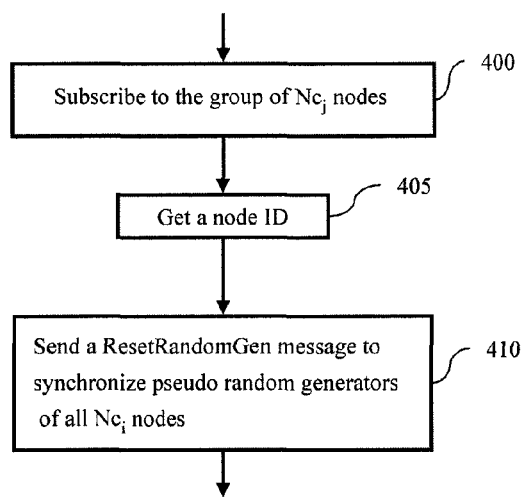

Fig. 4

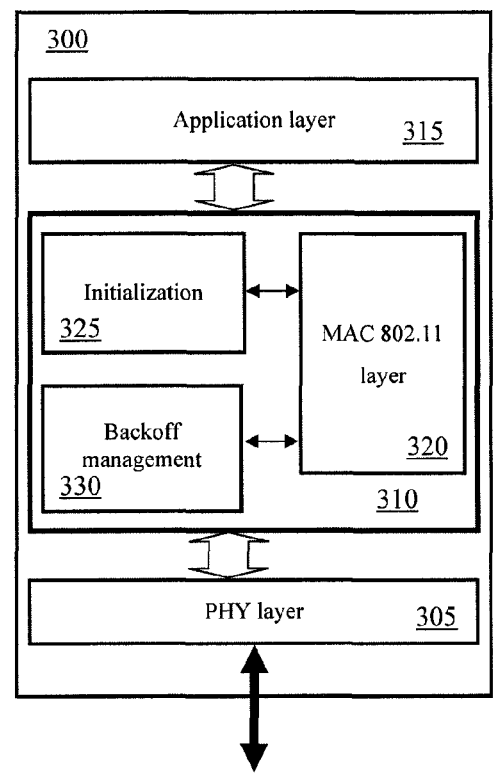

Fig. 3

*BackOff*: current backoff value

| Current backoff value Nc$_0$ | Cuurent backoff value Nc$_1$ | Current backoff value Nc$_2$ | ... | Current backoff value Nc$_i$ | ... | Current backoff value Nc$_n$ |
|---|---|---|---|---|---|---|

Fig. 6a

*RandGen*: initial backoff value for a next transmission

| Next init. backoff value Nc$_0$ | Next init. backoff value Nc$_1$ | Next init. backoff value Nc$_2$ | ... | Next init. backoff value Nc$_i$ | ... | Next init. backoff value Nc$_n$ |
|---|---|---|---|---|---|---|

Fig. 6b

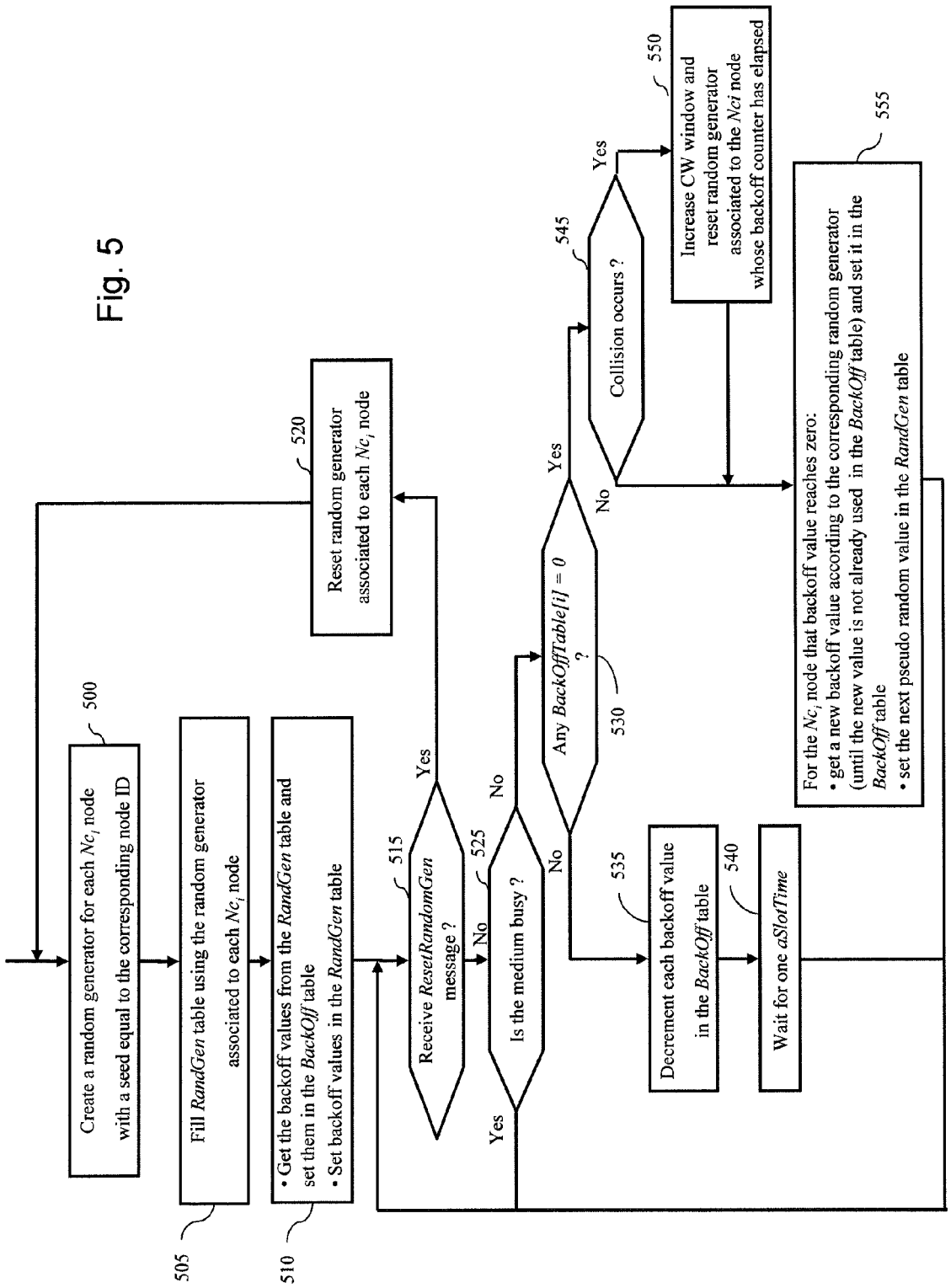

METHOD AND DEVICE FOR OPTIMIZING ACCESS TO A MEDIUM IN A COMMUNICATION NETWORK

The present invention relates generally to wireless communication networks and more specifically to a method and a device for optimizing sharing of backoff values for collision avoidance in wireless networks so as to optimize the medium access in a wireless communication network based on contention avoidance medium access mechanism.

The 802.11 MAC (acronym of Medium Access Control) standard supports shared accesses to a wireless medium through a technique called Carrier Sense Multiple Access with Collision Avoidance (CSMA/CA). The 802.11 standard is mainly directed to the waiting management of nodes waiting for the medium to become idle so as to authorize access to the medium.

According to a communication mode of that standard, known as Distributed Coordination Function Carrier Sense Multiple Access with Collision Avoidance (DCF), a wireless channel, generically referred to as the medium, is sensed by a source node so that transmission of data packets from the source node to a destination node is permitted when the sensed wireless channel is idle. If the channel is sensed as being busy, the source node defers its transmission.

The backoff algorithm is a well-known method to solve contention between different source nodes that need to access a medium (typically a wireless channel) simultaneously: the method requires each of these nodes to choose a random number of time units, called backoff value or backoff period, and wait for that number of time units to elapse before accessing the medium, continuously checking (each time unit) whether or not another node accesses the medium.

Therefore, when the medium becomes idle, the source node waits for a random backoff period to elapse during which it continues to sense the medium. At the end of that period and if the medium is still idle, the source node begins transmitting data packets. The random backoff period reduces the risk of collision between data packets transmitted by the given source node and other source nodes since the other source nodes waiting to access the medium are likely to use a different random backoff period.

It is to be recalled that the time unit in the 802.11 standard is the slot time generally called aSlotTime parameter. This parameter is specified by the physical layer (PHY). It is, for example, equal to 9 μs for the 802.11n standard. All the dedicated time periods, for example SIFS, PIFS, and DIFS, are multiples of that time unit.

The Short Inter-Frame Space (SIFS) is used to separate a response frame from the frame that requested the response, for example between a data frame and the acknowledgement response. The SIFS is, for example, equal to 16 μs according to the 802.11n standard. The PCF Inter-Frame Space (PIFS) provides the next highest access priority time space after the SIFS time (PIFS=SIFS+aSlotTime). The DCF Inter-Frame Space (DIFS) defines the minimum waiting time, after detecting that a medium is idle, before a transmitting node can attempt to transmit data packets (DIFS=SIFS+2×aSlotTime). The different inter-frame space durations provide access to a wireless medium at different priority levels.

FIG. 1 is a time diagram illustrating the DCF and backoff access mechanism for accessing a communication medium for transmitting data packets. In the given example, three different source nodes, referred to as node A, node B, and node C, need to access the medium.

As depicted with triangular marks, node B needs to transmit data at time $t_0$ while node A is transmitting data packets. Similarly, node C needs to transmit data at time $t_1$ while node A is still transmitting data packets.

However, a node must first sense the medium over a DIFS duration before initiating any transmission on the wireless medium. If the wireless medium is still idle at the end of the DIFS duration, the transmitting node initiates its transmission process. To that end, it invokes a backoff procedure using a backoff counter to count down a backoff value (corresponding to a number of time units) randomly obtained from a range defined by zero and a contention window (CW) value ([0; CW]).

It is to be noted that when the wireless medium goes from a busy to an idle state, several nodes may be ready to send data packets. To minimize collisions, the nodes that need to initiate data transfers select a random backoff value and defer communication for the corresponding number of time units. The random backoff value is generally a pseudo-random integer determined according to a uniform distribution over the range [0, CW]. The contention window (CW) parameter varies from a minimum value (CWmin) to a maximum value (CWmax). According to the backoff mechanism, the contention window (CW) parameter is increased on each erroneous transmission, that is to say on each collision on the medium, until it reaches the CWmax value. It is reset to the CWmin value after each successful data transmission.

To begin the random backoff procedure in a node, the latter selects a random backoff value in the range [0, CW]. All backoff slots (of length aSlotTime) occur in the backoff window or contention window following a DIFS duration during which the medium is sensed to be idle. During each backoff slot, the node continues to sense the wireless medium. If the wireless medium becomes busy during a backoff slot, the backoff procedure is frozen until the wireless medium again becomes idle. The backoff counter is then resumed after a DIFS duration.

Accordingly, returning to FIG. 1, node B is sensing the medium from time $t_0$ to detect its idle state. Likewise, node C is sensing the medium from time $t_1$. At time $t_2$, both nodes B and C determine that the medium is no longer busy. Therefore, at time $t_3$, that is to say after having determined that the medium is still idle at the end of the DIFS duration, the backoff value associated with each node waiting to transmit data (i.e., nodes B and C) is decreased until one of the values reaches zero. When a backoff value reaches zero, the corresponding node initiates a transmission.

When it is detected that the medium is no longer in its idle state, counting down the backoff value is suspended in each of those waiting nodes.

As shown in FIG. 1, the backoff values of nodes B and C are decreased from time $t_3$ until the medium is no longer in an idle state (or until one of the backoff values reaches zero since, in such a case, one of those waiting nodes accesses the medium that consequently is no longer in the idle state). For the sake of illustration, it is assumed that the backoff value associated with node C reaches zero at time $t_4$. Accordingly, node C can access the medium for transmitting data while counting down the backoff value associated with node B is suspended.

If collision occurs at time $t_5$, the transmitting node invokes a new backoff procedure by increasing the range of the collision window to determine a new number of backoff time units (such procedure is called Exponential Backoff Algorithm in the standard).

Time $t_5$ designates here the time at which the backoff value associated with node B would have reached zero if it had not been suspended at time $t_4$. The value of the backoff value associated with node B at time $t_4$ is called the remaining backoff value.

When node C ceases to use the medium, at time $t_6$, node B determines that the medium is in an idle state. Accordingly, after the following DIFS duration (i.e. at time $t_7$), the backoff mechanism is invoked and the backoff value associated with node B is decreased (starting from its remaining value as illustrated) so that node B can access the medium if it is still in an idle state when the backoff value reaches zero (time $t_8$).

According to the example given with reference to FIG. 1, the node having the smallest backoff value (node C) wins the contention resolution mechanism and transmits its data packets first. The remaining nodes suspend their backoff procedure and resume with a DIFS time after the medium goes idle again. The node with the next smallest backoff value (node B) counts down the remaining backoff value and is the next to win the medium access.

In a network using a CSMA/CA medium access mechanism, it is not possible to guarantee medium access. This may lead to difficulties in transporting data such as video streams requiring low latency.

There exist solutions that cope with such a problem. For example, the system disclosed in U.S. Patent Application No. 2009/0141738 uses a reservation-based distributed collision avoidance channel access in a wireless area network. By advertising the future channel access parameters in advance, nodes reduce the number of collisions. At the end of a data transmission, the corresponding node publishes its future backoff value and all other nodes store the published backoff value in a reservation table so as to avoid collision for its own future medium access attempts. If a node detects that a collision would occur with another node having published its next backoff value, it reschedules its next access attempts.

However, although such a solution may solve the above mentioned problem, its protocol requires heavy message exchanges for the distribution of backoff values. It requires a node to obtain channel access before advertising its backoff value. It is also sensitive to transmission errors and requires a bandwidth overhead.

Therefore, there is a need to provide a method and a device for improving network access using a CSMA/CA medium access mechanism.

Thus, it is a general object of the invention to remedy the shortcomings of the prior art as described here above.

To that end, the present invention concerns, in particular, a method for optimizing access to a medium in a communication network which can be accessed by a plurality of nodes, each node of the plurality of nodes using a medium access mechanism of the Carrier Sense Multiple Access with Collision Avoidance type based on a computation of a backoff value, a specific value being associated with each node of a set of nodes of the plurality of nodes, the specific value of a node being known by the other nodes of the set of nodes, the method being such that a step of determining a backoff value for each node of the set of nodes is carried out in each node of the set of nodes, the backoff value associated with a node being determined as a function of the specific value associated with that node.

Therefore, according to the method of the invention, the backoff values of the nodes of a privileged set of nodes are known by each node of the privileged set of nodes and thus, the access to the medium is optimized for the nodes of the set of privileged nodes, even if the communication network is overcrowded. Accordingly, the bandwidth usage is optimized for the nodes of the set of privileged nodes. According to the invention, no medium access collision may normally occur among the nodes of the set of privileged nodes and a master node is not required.

In a particular embodiment, the method further comprises a step of decrementing the backoff value associated with each node of the set of nodes if all the backoff values associated with the nodes of the set of nodes are different from zero, the step of decrementing the backoff values being carried out in each node of the set of nodes. Accordingly, each node of the set of privileged nodes is able to determine when a node of the set of privileged nodes is contending for the medium access. In that case, each node of the set of privileged nodes knows implicitly if a peer has been granted the medium successfully.

Still in a particular embodiment, the method further comprises a step of determining whether or not a collision would occur according to the medium access mechanism if the backoff value associated with a node of the set of nodes reaches zero, the step of determining if a collision would occur being carried out in each node of the set of nodes, for identifying a medium access collision between a node of the set of privileged nodes and another node. Therefore, standard node, for example nodes conforming to 802.11 standard, can access the medium without any modification regarding their backoff algorithm.

Advantageously, the method further comprises, if a collision would occur, a step of increasing the value of a contention window used for determining the backoff value for each node of the set of nodes, the step of increasing the value of the contention window being carried out in each node of the set of nodes, the step of determining a backoff value being carried out again in each node of the set of nodes, for the node of the set of nodes at the origin of the collision, after the value of the contention window is increased. Accordingly, a new backoff value is associated with the node of the set of privileged nodes contending for the medium access.

Preferably, the method further comprises the following steps if no collision would occur,
   transmitting data through the communication network, the step of transmitting data being carried out by the node of the set of nodes whose associated backoff value is equal to zero; and,
   determining a new backoff value for the node of the set of nodes whose associated backoff value is equal to zero, the step of determining a new backoff value for the node of the set of nodes whose associated backoff value is equal to zero being carried out in each node of the set of nodes.

Therefore, according to the invention, not any specific messaging protocol is required for the nodes to access the medium while avoiding medium access collision among the nodes of the set of privileged nodes.

In a particular embodiment, the function applied on the specific value associated to each node of the set of nodes is a pseudo-random generator taking the associated specific value as a seed, the pseudo-random generators used in each node of the set of nodes being preferably based on a same random value computation algorithm. Accordingly, each node of the set of privileged nodes is able to determine a new backoff value associated with a node of the set of privileged nodes, the backoff values determined in each node of the set of privileged being the same.

Still in a particular embodiment, the method further comprises a step of verifying that the backoff value determined for a node of the set of nodes is different from the backoff value determined for each other node of the set of nodes, another backoff value being determined if a backoff value determined for a node of the set of nodes is equal to the backoff value determined for another node of the set of nodes, the verifying step being carried out in each node of the set of nodes. Accordingly, the backoff values associated to the nodes of the set of privileged nodes are different, avoiding medium access collision among the nodes of the set of privileged nodes.

Still in a particular embodiment, the step of determining a backoff value for each node of the set of nodes is carried out again in each node of the set of nodes upon reception of a specific message generated when a new node is added to the set of nodes. Therefore, the set of privileged nodes can be easily modified.

Still in a particular embodiment, the specific values associated with the nodes of the set of nodes are node identifiers.

Another object of the invention is a computer program comprising instructions for carrying out each step of the method described above when the program is loaded and executed by a programmable apparatus, and an information storage means readable by a computer or a microprocessor storing instructions of a computer program, characterized in that it makes it possible to implement a method of optimizing access to a medium as described above.

It is still another object of the invention to provide a device for a node for optimizing access to a medium in a communication network that can be accessed by a plurality of nodes, each node of the plurality of nodes using a medium access mechanism of the Carrier Sense Multiple Access with Collision Avoidance type based on a computation of a backoff value, a specific value being associated with each node of a set of nodes of the plurality of nodes, the specific value of a node being known by the other nodes of the set of nodes, the device comprising means for determining a backoff value for each node of the set of nodes, the backoff value associated with a node being determined as a function of the specific value associated with that node.

Therefore, according to the device of the invention, the backoff values of nodes of a privileged set of nodes are known by each node of the privileged set of nodes, the access to the medium being optimized for the nodes of the set of privileged nodes, even if the communication network is overcrowded. Accordingly, the bandwidth usage is optimized for the nodes of the set of privileged nodes. According to the invention, no medium access collision may normally occur among the nodes of the set of privileged nodes and a master node is not required.

In a preferred embodiment, the device further comprises means for decrementing the backoff value associated with each node of the set of nodes if all the backoff values associated with the nodes of the set of nodes are different from zero. Accordingly, each node of the set of privileged nodes is able to determine when a node of the set of privileged nodes is contending for the medium access.

Still in a preferred embodiment, the device further comprises means for determining whether or not a collision would occur according to the medium access mechanism if the backoff value associated with a node of the set of nodes reaches zero, and preferably means for increasing the value of a contention window used for determining the backoff value for each node of the set of nodes, if a collision would occur, the means for determining a backoff value being invoked by the means for increasing the value of the contention window, for determining a backoff value for the node of the set of nodes at the origin of the collision.

Therefore, standard node, for example nodes conforming to 802.11 standard, can access the medium without any modification regarding their backoff algorithm.

Advantageously, the device further comprises means for verifying that the backoff value determined for a node of the set of nodes is different from the backoff value determined for each other node of the set of nodes and for determining another backoff value if a backoff value determined for a node of the set of nodes is equal to the backoff value determined for another node of the set of nodes. Accordingly, the backoff values associated to the nodes of the set of privileged nodes are different, avoiding medium access collision among the nodes of the set of privileged nodes.

Further advantages of the present invention will become apparent to the ones skilled in the art upon examination of the drawings and detailed description. It is intended that any additional advantages be incorporated herein.

FIG. 3 is a block diagram illustrating schematically the architecture of a node adapted to incorporate the invention, for example a node $Nc_i$ of FIG. 2;

FIG. 4 is a block diagram illustrating steps of an example of an algorithm used during an initialization phase when a new node is added to a set of nodes considered as privileged;

FIG. 5 is a block diagram illustrating steps of an example of an algorithm carried out by the backoff management block 330 of FIG. 3 according to the invention; and, FIG. 6, comprising FIG. 6a and FIG. 6b, illustrates an example of BackOff and RandGen tables, respectively, that are stored in each node of the set of privileged nodes.

According to an embodiment of the invention, a set of nodes of a communication sub-network, using a CSMA/CA access mechanism, is identified as a set of privileged nodes that try to contend continuously for the communication medium of the sub-network. Accordingly, the nodes of the set of privileged nodes use a dedicated shared backoff time calculation method for collision avoidance within the sub-network so as to decrease the medium access time for these nodes. According to a particular embodiment, each node of the set of privileged nodes owns a unique node identifier that is used by the shared backoff time calculation algorithm for determining a backoff value associated with each of these nodes, the backoff value being most of the time different for each of these nodes. Alternatively, other values, specific to each node of the set of privileged nodes and known by these nodes may be used.

As described below, a pseudo-random generator is preferably used in each node of the set of privileged nodes to determine a backoff value for each of these nodes. A seed of such a pseudo-random generator is the node identifier (or a value that is unique to each node of the set of privileged nodes and known by all of these nodes) of the corresponding node.

When a new node is added to the set of privileged nodes, the current used backoff values of all the nodes of the set of privileged nodes are synchronized as described herein below.

According to an embodiment of the invention, each node of the set of privileged nodes checks if another node of this set uses the backoff value provided by its own pseudo-random generator.

For each time unit during which the backoff algorithm conforming to the invention is invoked, each node of the set of privileged nodes updates internally the current backoff value of all of the set of privileged nodes.

Figure 1:
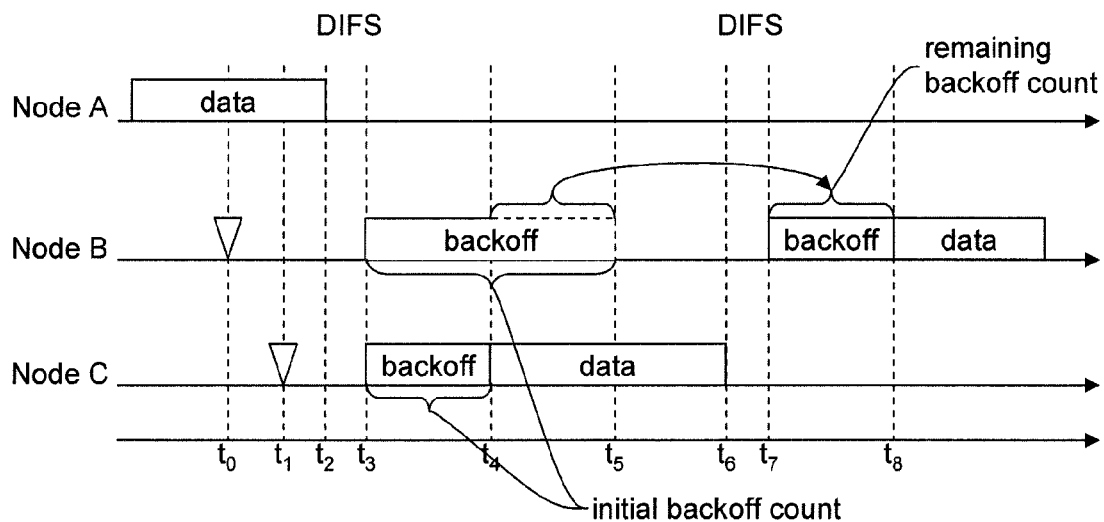
FIG. 1 is a time diagram illustrating the DCF and backoff access mechanism for accessing a communication medium for transmitting data packets.
Figure 2:
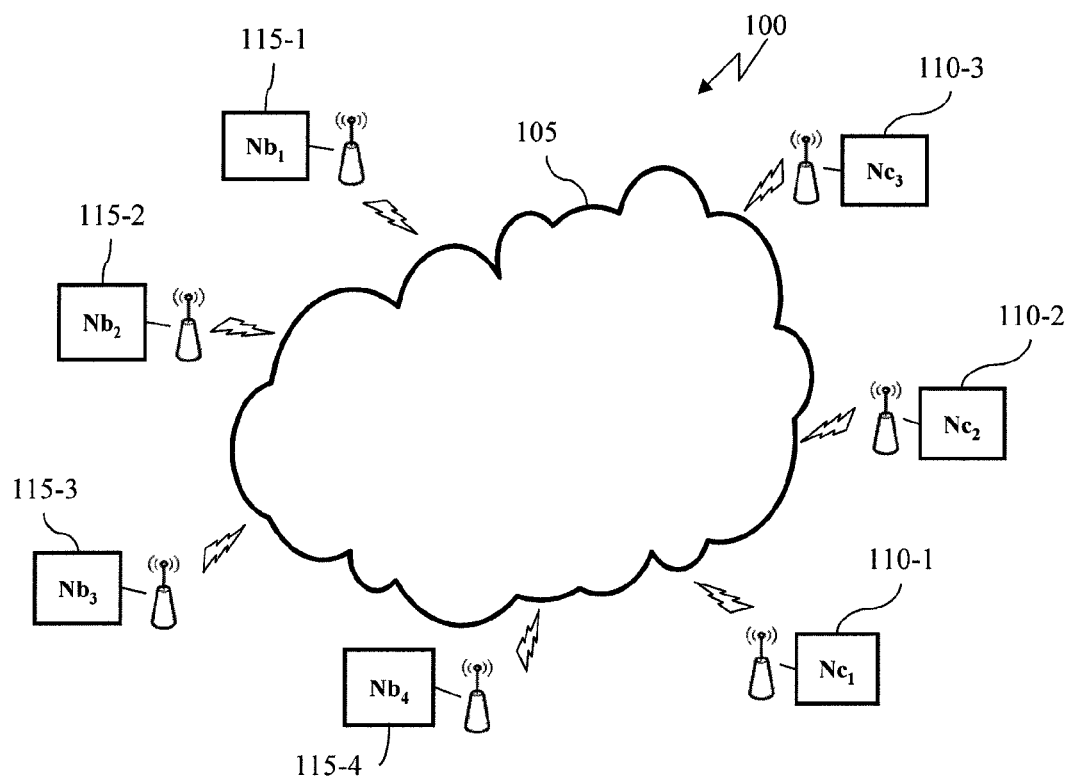
FIG. 2 is an example of a communication system where the present invention can be implemented.

FIG. 2 is an example of a communication system 100 where the present invention can be implemented. The communication system 100 comprises a transmission medium 105 allowing several nodes to exchange data packets. Such a transmission medium may drop or corrupt transmitted data packets. The transmission medium 105 conforms to the CSMA/CA channel access mechanism. For the sake of illustration, transmission medium 105 can be a wireless network implementing the 802.11 standard.

The nodes of the communication system 100 may be divided in two sets: a set of privileged nodes and a set of nodes implementing the 802.11 standard. According to the given example, the set of privileged nodes comprises the nodes 110-1 to 110-3, referred to as $Nc_i$ nodes, while the set of nodes implementing the 802.11 standard comprises the nodes 115-1 to 115-4, referred to as $Nb_i$ nodes.

For the sake of illustration, all data exchanges between nodes of the communication system 100, that is to say nodes $Nc_i$ and nodes $Nb_i$, are managed through the standardized 802.11n MAC/PHY layers.

FIG. 3 is a block diagram illustrating schematically the architecture of a node 300 adapted to carry out, at least partially, the invention, for example a node $Nc_i$ of FIG. 2. As illustrated, node 300 comprises a physical (PHY) layer block 305, a MAC layer block 310, and an application layer block 315.

The PHY layer block 305 (here a 802.11 standardized PHY layer) is in charge of formatting and sending data packets on the medium used (e.g. a wireless medium) as well as receiving data packets from that medium. The MAC layer block 310 comprises a standard MAC 802.11 layer 320 and two additional blocks 325 and 330 for carrying out, at least partially, the invention. According to a particular embodiment, the initialization block 325 is in charge of initiating the shared backoff time calculation procedure while the backoff management block 330 is in charge of managing the backoff values used by the nodes of the set of privileged nodes, according to the invention. Finally, the application layer block 315 implements an application generating and receiving data packets, for example data packets of a video stream.

Accordingly, the node 300 comprises means to transmit data packets in a network using a CSMA/CA medium access mechanism as well as means to receive data packets in a network using a CSMA/CA medium access mechanism. Moreover, according to an implemented standard, for example the 802.11 standard, the node 300 comprises means to allocate, in cooperation with other nodes linked to node 300, node identifiers. The initialization and backoff management blocks 325 and 330 provide means for the node 300 to generate a pseudo-random value using a node identifier as seed in order to compute a backoff value, means for comparing a computed backoff value with backoff values used by a set of nodes, means for regenerating a new pseudo-random value if the computed backoff value is already used, and means for updating the backoff values used by a set of nodes.

It is to be noted that the means for pseudo-random generation in the backoff management block 330 are similar for all the nodes of the set of privileged nodes. In other words, all the nodes of the set of privileged nodes implement the same pseudo-random generator algorithm. As a consequence, knowing the seed of the generator allows exactly the same series of random values to be retrieved in different nodes.

FIG. 4 is a block diagram illustrating steps of an example of an algorithm used during an initialization phase when a new node is added to a set of privileged nodes (nodes $Nc_i$ of FIG. 2), according to the invention. The steps depicted on FIG. 4 are typically executed by the initialization block 325 of the node 300 represented in FIG. 3.

A first step to be carried out when a new node is to be added in a network conforming the 802.11 standard is the identification of a right channel frequency. This is typically done during the booting of the node by scanning the available frequencies. Next, the new node requests other nodes of the set of privileged nodes to subscribe to that set (step 400).

Following the transmission of such a request, the new node receives a node identifier (step 405), referred to as nodeID below, which is determined, for example, according to the 802.11 standard MAC protocol. Such a nodeID may be for example, the MAC address of the node or a function of the MAC address. As described above, the node identifiers are used as a seed of a pseudo-random generator for determining a backoff value for each corresponding node of the set of privileged nodes. It is to be noted that, as mentioned above, the nodeID can be, in the meaning of the invention, any value that is specific to a node and that is known by the other nodes.

A following step of the initialization phase is to synchronize, in all the nodes of the set of privileged nodes, the next backoff value to be used by each node of the set of privileged nodes. Several embodiments can be implemented to perform that step.

In one embodiment using the 802.11 standard MAC protocol, the new node can send a particular message (step 410), referred to as ResetRandomGen message below, to all nodes of the set of privileged nodes, specifying that the pseudo-random generators of all of these nodes must be reinitialized after the end of the next transmission on the medium.

According to another embodiment, the ResetRandomGen message can contain a timestamp specifying the date at which the pseudo-random generators of all nodes of the set of privileged nodes must be reinitialized. It should be noted that all these nodes must use a synchronization mechanism whose precision of the clock drift is not greater than the half duration of a aSlotTime time. The synchronization mechanism specified in the 802.11 standard, called the Timing Synchronization Function (TSF), provides for this requirement for a network containing no more than 10 nodes.

FIG. 5 is a block diagram illustrating steps of an example of an algorithm that may be carried out by the backoff management block 330 of FIG. 3 according to the invention. As described above, the backoff management block 330 is in charge of controlling the medium access of the node and updating the backoff value for each node of the set of privileged nodes. This algorithm is executed by each node of the set of privileged nodes.

According to a particular embodiment, the backoff values associated with each node of the set of privileged nodes and stored in each of these nodes are managed and stored using two tables. A first table, referred to as BackOff, is used for storing the current backoff value used by each node of the set of privileged nodes (BackOff[i] is the current backoff value used by the node $Nc_i$ of the set of privileged nodes). A second table, referred to as RandGen, is used for storing the initial backoff value used by each node of the set of privileged nodes for a next transmission.

FIG. 6, comprising FIG. 6a and FIG. 6b, illustrates an example of the BackOff and RandGen tables, respectively, that are stored in each node of the set of privileged nodes.

It is to be observed that since these tables are managed similarly in each node of the set of privileged nodes, the values memorized in these tables are the same in each of these nodes. The BackOff and RandGen tables each comprise n columns corresponding to the n nodes of the set of privileged nodes.

Returning to FIG. 5, a first step consists in creating a pseudo-random generator for each node $Nc_j$ of the set of privileged nodes, with a seed equal to the corresponding nodeID (step 500). It is observed that since nodeIDs are known by all the nodes of the set of privileged nodes, using a nodeID as the seed of a pseudo-random generator means that the resulting lists of backoff values are precisely known by all $Nc_j$ nodes without any message exchange.

The pseudo-random generators are advantageously set in such a way that the generated pseudo-random values are comprised within the range [0; CW].

Creating a pseudo-random generator for each node $Nc_i$ of the set of privileged nodes means, in the context of the invention, preparing a pseudo-random function having a specific seed so that the function yields a pseudo-random value each time it is called. Accordingly, the pseudo-random value obtained by the function executed in a node with a specific seed, after having been called a number j of times, is the same as the pseudo-random value obtain by the same function executed in another node with the same specific seed, after having been called the same number j of times.

Next, the RandGen table is initialized using the pseudo-random generator associated with each node of the set of privileged nodes (step 505). To that end, each pseudo-random generator is selected to generate a pseudo-random value that is considered as a backoff value and stored as such in the RanGen table. If one of the obtained backoff values is equal to another obtained backoff value, another one is obtained to replace the one that is equal to the other one. This is repeated until each backoff value is different from all the other backoff values.

The stored backoff values represent the initial backoff values for the next transmission by each node of the set of privileged nodes. Accordingly, these backoff values are copied in the BackOff table representing the current backoff values and new pseudo-random values are obtained from the random generators and stored in the RandGen table (step 510), these new values representing the initial backoff value for the next transmission of each node of the set of privileged nodes.

A test is then performed to determine whether or not a ResetRandomGen message has been received (step 515), such a message being received each time a new node is added in the set of privileged nodes. If a ResetRandomGen message has been received, a synchronization step of the nodes of the set of privileged nodes is carried out (step 520). Such a step may consist, for example, in resetting the pseudo-random generator associated with each node of the set of privileged nodes so as to create a new pseudo-random generator for each node of the set of privileged nodes (comprising the new node) at step 500. Consequently, each node of the set of privileged nodes knows the backoff values of all the others nodes of the set of privileged nodes (for the reasons described above) and is precisely synchronized. Since, each node of the set of privileged nodes knows when the value of the backoff counter of each of these nodes reaches zero, collision among these nodes is avoided.

If a ResetRandomGen message has not been received, another test is performed to determine whether or not the medium is busy (step 525). If the medium is busy, the backoff counter is frozen and the process branches at step 515 to check for the possible reception of a ResetRandomGen message.

When the medium becomes idle (step 525), another test is performed to determine whether or not a backoff counter of a node of the set of privileged nodes elapses (which happens when the corresponding backoff value reaches zero), that is to say if there is an index value i such that BackOff[i]=0 (step 530). If no backoff counter of the nodes of the set of privileged nodes has elapsed, the backoff counter of each node of the set of privileged nodes is decreased by one (step 535), that is to say that each value of the BackOff table is decreased by one, a waiting time of one aSlotTime is performed (step 540), and the process branches to step 515 wherein it is determined whether or not a ResetRandomGen message has been received.

If the backoff value of one of the nodes of the set of privileged nodes reaches zero (step 530), another test is performed to determine whether or not a collision would occur between a node of the set of privileged nodes trying to transmit data packets and another node (step 545) not belonging to the set of privileged nodes (for example nodes $Nb_i$ of FIG. 2). If a collision would occur, the CW value is increased, preferably as specified by the 802.11 standard, the pseudo-random generator associated with the node of the set of privileged nodes, whose backoff counter has elapsed, is reset (step 550), and the process branches to step 555 described hereafter.

If no collision would occur (step 545), the node whose backoff value reaches zero accesses the medium for transmitting data packets (not represented). It is to be noted that since the process described by reference to FIG. 5 is carried out by each node of the set of privileged nodes, each of these nodes may determine which node is accessing the medium.

The backoff procedure of the node accessing the medium is reinitialized (step 555). Such a reinitialization step may consist in getting a new backoff value for the node whose backoff value has just reached zero. Such new backoff value is obtained from the pseudo-random generator associated with the corresponding node. If the new backoff value is equal to a backoff value of the BackOff table, another new backoff value is obtained similarly. This is repeated until the new backoff value is different from all the backoff values. The obtained new backoff value is stored in the BackOff table and the next backoff value is obtained (still from the pseudo-random generator associated with the node whose backoff value reaches zero) and stored in the RanGen table.

Again, it is to be noted that because the process is carried out in each node of the set of privileged nodes, the coherency of the BackOff and RandGen tables of these nodes is maintained.

It is to be noted that if the number of nodes of the set of privileged nodes is greater than the CW value, it is impossible to allocate a different backoff value for each of these nodes. Accordingly, the value of CW is advantageously chosen so as to be greater than the number of nodes of the set of privileged nodes. In such a case, the access delay may be increased but the solution remains fair for all the nodes of the network.

It is also noted that each node of the set of privileged nodes must be directly seen by all others nodes of that set because of the synchronization of the backoff values of the nodes of the set of privileged nodes that is directly linked to the medium status.

Naturally, in order to satisfy local and specific requirements, a person skilled in the art may apply, to the solution described above, many modifications and alterations all of which, however, are included within the scope of protection of the invention as defined by the following claims.

The invention claimed is:

1. A method for optimizing access to a medium in a communication network which can be accessed by a plurality of nodes, each node of the plurality of nodes using a medium access mechanism of the Carrier Sense Multiple Access with Collision Avoidance type based on a computation of a backoff value, the method comprising:
identifying a set of nodes of the plurality of nodes;
associating, for each node of the set, a specific value known by the other nodes of the set;
determining, by each node of the set, a backoff value for each node of the set, each backoff value being determined as a function of the specific value associated with that node; and
decrementing, by each node of the set, the backoff values associated with all the nodes of the set if all the backoff values associated with all the nodes of the set are different from zero.

2. The method of claim 1 further comprising a step of determining, by each node of the set, whether or not a collision would occur according to the medium access mechanism if the backoff value associated with a node of the set of nodes reaches zero.

3. The method according to claim 2 further comprising, if it is determined that a collision would occur, the steps of:
increasing, by each node of the set, the value of a contention window used for determining the backoff value for each node of the set; and
determining, by each node of the set, a new backoff value for the node of the set at the origin of the collision, after the value of the contention window is increased.

4. The method according to claim 2 further comprising, if it is determined that no collision would occur, the steps of:
transmitting, by the node of the set whose associated backoff value is equal to zero, data through the communication network; and
determining, by each node of the set, a new backoff value for the node of the set whose associated backoff value is equal to zero.

5. The method according to claim 1, wherein the function applied on the specific value associated to each node of the set is a pseudo-random generator taking the associated specific value as a seed.

6. The method according to claim 5, wherein the pseudo-random generators used in each node of the set are based on a same random value computation algorithm.

7. The method according to claim 1 further comprising the steps of:
verifying, by each node of the set, that the backoff value determined for a node of the set is different from the backoff value determined for each other node of the set; and
determining another backoff value if a backoff value determined for a node of the set is equal to the backoff value determined for another node of the set.

8. The method according to claim 1, wherein the step of determining a backoff value for each node of the set is carried out again in each node of the set upon reception of a specific message generated when a new node is added to the set.

9. The method according claim 1, wherein the specific values associated with the nodes of the set are node identifiers.

10. An information storage means readable by a computer or a microprocessor storing instructions of a computer program, characterized to implement a method of optimizing access to a medium, the method comprising:
identifying a set of nodes of a plurality of nodes;
associating, for each node of the set, a specific value known by the other nodes of the set;
determining, by each node of the set, a backoff value for each node of the set, each backoff value being determined as a function of the specific value associated with that node; and
decrementing, by each node of the set, the backoff values associated with all the nodes of the set if all the backoff values associated with all the nodes of the set are different from zero.

11. A node configured to optimize access to a medium in a communication network accessible by a plurality of nodes, and to use a medium access mechanism of the Carrier Sense Multiple Access with Collision Avoidance type based on a computation of a backoff value, the node comprising an initialization block and a backoff management block configured to implement a method for optimizing access by the node to the medium, the method comprising:
joining a set of nodes of the plurality of nodes;
receiving a specific value of a node known by the other nodes of the set;
determining, by each node of the set, a backoff value for each node of the set, each backoff value being determined as a function of the specific value associated with that node; and
decrementing, by each node of the set, the backoff values associated with all the nodes of the set if all the backoff values associated all the nodes of the set are different from zero.

12. The node according to claim 11, wherein the backoff management block is further configured to determine whether or not a collision would occur according to the medium access mechanism if the backoff value associated with a node of the set reaches zero.

13. The node according to claim 12, wherein the backoff management is further configured to, if it is determined that a collision would occur;
increase the value of the contention window used for determining a backoff value; and
determine a new backoff value if the node was the node of the set at the origin of the collision.

14. The node according to claim 11, wherein the backoff management block is further configured to:
verify that the backoff value determined for a node of the set is different from the backoff value determined for each other node of the set and
determine another backoff value if a backoff value determined for a node of the set is equal to the backoff value determined for another node of the set.

* * * * *